(12) United States Patent
Degand

(10) Patent No.: US 6,838,181 B1
(45) Date of Patent: Jan. 4, 2005

(54) GLAZING

(75) Inventor: Etienne Degand, Jurnet (BE)

(73) Assignee: Glaverbel, Brussels (BE)

( * ) Notice: Subject to any disclaimer, the term of this patent is extended or adjusted under 35 U.S.C. 154(b) by 30 days.

(21) Appl. No.: 10/069,130

(22) PCT Filed: Aug. 21, 2000

(86) PCT No.: PCT/EP00/08205

§ 371 (c)(1),
(2), (4) Date: Mar. 13, 2002

(87) PCT Pub. No.: WO01/14136

PCT Pub. Date: Mar. 1, 2001

(30) Foreign Application Priority Data

Aug. 26, 1999 (EP) .............................. 99202757

(51) Int. Cl.[7] .......................... B32B 17/06; C23C 14/32
(52) U.S. Cl. ................... 428/434; 428/426; 428/432; 428/433; 428/209; 204/192.15; 204/192.26
(58) Field of Search ................. 428/426, 432, 428/433, 434, 469, 195, 209, 220; 204/192.15, 192.26

(56) References Cited

U.S. PATENT DOCUMENTS

| | | | | |
|---|---|---|---|---|
| 4,325,987 A | * | 4/1982 | Kalbskopf et al. .......... 427/110 |
| 4,554,199 A | * | 11/1985 | Roentgen et al. ........... 428/194 |
| 4,939,348 A | * | 7/1990 | Criss .......................... 219/547 |
| 5,024,895 A | * | 6/1991 | Kavanagh et al. .......... 428/437 |
| 5,071,692 A | * | 12/1991 | Jourdaine .................... 428/192 |
| 5,093,177 A | * | 3/1992 | Anderson et al. ............. 428/81 |
| 5,128,513 A | * | 7/1992 | Byars et al. ................. 219/203 |
| 5,529,654 A | * | 6/1996 | Kavanagh et al. .......... 156/229 |
| 5,716,694 A | * | 2/1998 | Jacquemet .................. 428/192 |

FOREIGN PATENT DOCUMENTS

| EP | 391165 A | * | 10/1990 |
|---|---|---|---|
| EP | 419321 A | * | 3/1991 |
| EP | 771766 A1 | * | 5/1997 |
| EP | 893726 A1 | * | 1/1999 |

* cited by examiner

Primary Examiner—Stephen Stein
(74) Attorney, Agent, or Firm—Piper Rudnick LLP; Jerold I. Schneider

(57) ABSTRACT

A curved laminated automotive glazing panel (10) having a radius of curvature at at least one portion that is less than 500 mm has a glazing panel which is provided with a solar control coating layer (25) positioned at its convex internal surface (11) and in which the coating stack comprises at least two space sputtered silver containing layers initially deposited on a substantially flat sheet of glazing material which is subsequently bent to form a part of the glazing panel (10).

27 Claims, 2 Drawing Sheets

GLAZING

CROSS REFERENCE TO RELATED APPLICATIONS

This application is the U.S. National Stage of International Application No. PCT/EP00/08205 filed 21 Aug. 2000, and European Application No. 99202757.3 filed 26 August 1999. The entirety of each of those applications is incorporated herein by reference.

BACKGROUND OF THE INVENTION

This invention relates to laminated automotive glazing panels provided with solar control coating layers. Whilst the invention will be particularly described with reference to vehicle windscreens it should be understood that it may have other applications.

The use of coating layers is well know to modify the optical properties of glazings. In particular, coating layers may be used to reduce the proportion of incident solar energy which is transmitted through the glazing whilst allowing passage of sufficient visible light to ensure good visibility. This can reduce overheating of the interior of the vehicle in summer and is commonly achieved by reflection of incident solar radiation in the infra-red portion of the spectrum. Coating layers may also provide an electrically heatable element for a glazing. EP378917A (Nippon Sheet Glass Co.) discloses such coating layers.

The term solar control coating layer as used herein refers to a coating layer which increases the selectivity of the glazing panel i.e. the ratio of the proportion of incident visible radiation transmitted through the glazing to the proportion of incident solar energy transmitted through the glazing.

The term luminous transmittance as used herein means the luminous flux transmitted through a substrate as a percentage of the incident luminous flux measured using CIE Illuminant A at 2° observer.

There are a number of different families of solar control coating layers, each of which have differing properties and characteristics. These include:

a) pyrolytic coatings obtained by contacting a liquid or vapour composition with the hot surface of a glass sheet. Such coatings include tin oxide coatings doped with fluorine and indium tin oxide (ITO) coatings. Pyrolytic coatings have the general characteristic of being hard coatings (i.e. they are relatively resistant to abrasion) and of being relatively easy to handle during manufacturing processes without damage to the coating layer. Many pyrolytic coatings are inherently heat resistant to a sufficient extent to enable glass sheets to which they are applied to be bent and/or thermally tempered without significant deterioration of their solar control properties. A significant industrial advantage results from the ability to apply pyrolytic coatings to a continuous ribbon of flat glass for example as part of a process of making float glass. European patent application EP 353 141 A (Saint Gobain Vitrage) describes a heatable pyrolytic indium tin oxide coating on face 3 of a laminated windscreen. Such glazings have never found commercial success in the automotive field due particularly to the inherent optical and energetic limitations of this type of coating.

b) Sputtered single silver layer coatings obtained by sputtering a silver containing layer on to a supporting substrate. Such coatings usually comprise a coating stack having the general form: supporting substrate antireflective layer optional barrier layer/silver containing layer/optional barrier antireflective layer. In such a structure the silver containing layer serves to reflect radiation in the infra red portion of the spectrum, the antireflective layers serve to reduce reflection of light in the visible portion of the spectrum that would otherwise be caused by the silver containing layer and the optional barrier layers serve to protect to silver continuing layer either during deposition of the coating and/or subsequent processing. Whilst the optical performance of single silver layer sputtered coatings is reasonably good such sputtered coatings are general "soft" coatings i.e. they are not particularly resistant to abrasions and scratches and require significant care in handling to avoid damage. In addition, significant care in both the design and handling of such layers is required to enable them to be sufficiently heat resistant to allow tempering and/or bending of a substrate to which they are applied.

c) Sputtered double silver layers obtained by sputtering two, spaced silver layers onto a supporting substrate. Such coatings usually comprise a coating stack having the general form: supporting substrate/antireflective layer/optional barrier layer/silver containing layers optional barrier layer/ antireflective layer/optional barrier layer/silver containing layer/optional barrier antireflective layer. In such a structure the sliver containing layers serve to reflect radiation in the infra red portion of the spectrum, the antireflective layers serve to reduce reflection of light in the visible portion of the spectrum that would otherwise be caused by the silver containing layer and the optional barrier layers serve to protect to silver containing layers either during deposition of the coating and/or subsequent processing. The infra red reflective silver containing layers are commonly layers of silver or a silver alloy have a thickness in the order of 80 to 120 Å. The optical performance of double silver Layer sputtered coatings can be extremely good, especially in terms of their selectivity but perhaps even more so than with single silver sputtered coatings these coatings are extremely fragile both in terms of resistance to abrasions and scratches (for example during handling) and in their ability to withstand heating for example to enable them to be sufficiently heat resent to allow tempering and/or bending of a substrate to which they are applied.

One example of the use of sputtered coating layers In automotive applications is U.S. Pat. No. 4,668,270 (Ford Motor Company) which describes a car windscreen having an electrical heatable coating layer used for defrosting, de-icing and/or de-misting. The heatable waling, which is laminated between the two glass sheets of the windscreen, is supplied with electrical power via first and second bus bars which extend respectively along the top and bottom edges of the windscreen, each bus bar being silk screen printed on the glass in a silver ceramic material. The heatable coating is a multilayer coating consisting of zinc oxide and silver formed by magnetron sputtering.

The physical nature of double silver layer coatings layers is entirely different to tat of, for example, pyrolytic coating layers and, consequently, entirely to different techniques must be employed for their design, processing and use.

It has generally been believed in the art that the precautions of the techniques described below must be adhered to to enable the successful use of sputtered double silver layers In laminated automotive glazings:

1) that the sputtered double silver layers should be deposited on a carrier film of, for example pet (poly ethylene tetrachloride), which is assembled between the to glass sheets of a laminated glazing once the individual sheets have been bent to their desired final shape. One disadvantage of such carrier films is the difficulty of ensuring that the film correctly follows then precise contour of the bent glazing panel. Consequently, this procedure is limited to use with glazing panels of a relatively simple curvature. In addition, it is generally not desirable to electrical heat the solar control coating in such an arrangement due to deterioration of the coating and/or of the carrier film and it is also inconvenient to provide bus bars in this arrangement to relay electrical power to the coating. Consequently, this technique is generally unsuitable for use with heatable windscreens.

2) that, alternatively, the sputtered double silver layers should be applied to the concave face of a pre-bent sheet of glass prior to its assembly to form a laminated glazing panel. In this way, the coating layer is not subjected to the heat treatment necessary to form the desired curvature of the glass sheet disadvantages of his technique include the technical difficulty of sputter depositing coating layers onto a curved sheet of glass so as to ensure that the entire glass surface is evenly coated (due, amongst other things, to the variation in the distance between the different part of the glazing surface and he targets used for the sputtering process-small variations in thickness of the coating layers can cause undesirable colour variations across the glazing panel) and the complexity and limitations (including dimensional limitations-complex windscreens having deep curvatures will not always fit in to such coating machines simply because of their dimensions) of coaters which can sputter deposit layers onto a curved substrate. Consequently, this technique is also limited to use with relatively simple curvatures of glazing panels.

3) alternatively, sputter depositing a double silver coating layer onto a relatively flat sheet of glass and subsequently bending the glass sheet carrying the coating stack to its desired shape prior to assembly as a laminated glazing panel Due to the fragility of this type of coating, the glass sheet carrying the coating stack should be bent such that the coating stack is at the concave face of the curved sheet of glass. This is so that the layers of the coating stack have a tendency to be compressed during the bending process so as to ensure the integrity and continuity of the to layers of the coating stack, this is particularly so for complex curvatures of glaring

SUMMARY OF THE INVENTION

Thus, in order to successfully use a sputtered double silver layer coating on a complex curved glazing panel it is necessary either to deposit the coating onto a pre-curved glazing panel or to use a heat treatable sputtered double silver layer coating deposited on a substantially flat sheet of glass which is subsequently bent so that the coating is at its concave surface.

According to one aspect, the present invention provides a method of making a laminated automotive glazing panel having a radius of curvature at least one portion that is less than 500 mm comprising the steps of:

a) depositing a solar control coating layer comprising a coating stack having at least two spaced sputtered silver containing livers on a substantially flat sheet of glazing material:

b) bending said substantially flat sheet of glazing material carrying said solar control coating layer such that the solar control coating layer is positioned at a convex surface of the bent sheet of glazing material, and c) laminating said bent sheet of glazing material carrying the solar control coating layer at a convex surface with another sheet of glazing material to form a glazing panel in which the solar control coating layer is positioned at the interior of the laminated glazing panel.

The invention results from the unexpected realisation that despite prejudice in the art, a complex shape of glazing panel incorporating a sputtered double silver layer coating may be produced on an industrial scale by depositing the coating on a substantially flat sheet of glass and subsequently bending the glass sheet carrying the coating such that the coating is at the convex surface of the glazing panel This is possible despite the fact that subjecting the sputtered double silver coating layer to the tension an extension inherent in bending it into a convex shape would be expected to destroy the integrity and continuity of the coating layer and perhaps even to rest in significant disparities in the thickness of the coating layer over the area of the glazing panel. The realisation that this is possible with relatively complex curvatures is even more surprising firsty because complex curvatures require significant degrees of bending and would thus be expected to cause unacceptable tension and extension of the coating layer and secondly because complex curvatures require the heating of the glass substrate to a softening level at higher temperature and/or for a longer duration that simple curvatures and would thus be expected to put additional unacceptable stuns on the relatively fragile sputtered double silver coating layer.

One factor which may be used to define the complexity of curare of an automotive glazing is the radius of curvature. The smaller the radius of curvature, the more difficult it becomes to accurately and repeatable bend the glazing panel.

The present invention may be used in association with glazing panels having a radius of curvature at at least one portion that is less than 450 mm, less Can 400 mm, less than 350 mm, less than 300 mm, less than 250 mm, less than 200 mm, less than 150 mm or even less.

According to another aspect, the present invention provides a method of making a laminated automotive glazing panel having a cross curvature of greater than or equal to 15 mm comprising the steps of:

a) depositing a solar control coating layer comprising a coating stack having at least two spaced sputtered silver containing layers on a substantially flat sheet of glazing material;

b) bending said substantially flat sheet of glazing material carrying said solar control coating layer such that the solar control coating layer is positioned at a convex surface of the bent sheet of glazing material;

c) laminating said bent sheet of glazing material carrying the solar control coating layer at a convex surface with another sheet of glazing material to form a glazing panel in which the solar control coating layer is positioned at the interior of the glazing panel.

Another factor that may be used to define the complexity of curvature of an automotive glazing panel is it cross curvature. This is a measurement of the depth of curvature across the height of the glazing at the central portion of the glazing panel.

The present invention may be used in association with gang panels having a cross curvature Eat is at least 15 mm, at least 20 mm, at least 25 mm, at least 30 mm, at least 35 mm or greater.

The curvature of the glazing panel becomes even more complex when, for example, a significant minimum radius is combined with a significant cross curvature.

A further factor which may add to the complexity of curvature of an automotive glazing panel is the depth of bending. This is a measure of the greatest distance between the front face of the glazing panel and the end of the rearwardly projecting side wings of the glazing panel. The present invention may be used in association with a depth of bending of at least 150 mm, at least 170 mm, at least 190 mm, at least 200 mm, at least 220 mm, at least 240 mm, at least 250 mm or more.

The complexity of curvature is further increase if a significant depth of bending is combined with a significant minimum radius of curvature and/or a significant cross curvature.

The present invention may advantageously be used to provide a de-misting and/or de-icing function to the glazing by using a coating layer which is electrically heatable and pervading a pair of spaced bus bats to relay elect current to the coating layer. The exposed concave surface of a laminated windscreen is generally at the Interior of the vehicle. Positioning the coating layer on the convex surface sandwiched between the two glazing panels of the laminated structure may provide a number of advantages with respect to positioning a heatable sputtered double silver coating layer at the concave surface sandwiched between the two glazing panels of the laminated structure. These may include:

a) an improved de-misting function as the heatable coating layer is directly adjacent to the sheet of the glazing panel at the interior of the vehicle:
  b) a reduced risk of damaging the integrity of the coating layer in the case of a breakage or crack of the outer sheet of the gazing panel, for example due to the impact of gravel. Any discontinuity in the coating layer may cause a break in its electrical conductivity and a consequent overheating of immediately surrounding areas of the coating layer when elected current passes. Such overheating may cause deterioration of the coating layer and/or deterioration of the laminating film between the two sheets of the glazing panel In addition, the position of the to coating product it at least to some degree from the risk of corrosion by the ingress of moisture in the case of a breakage or crack in the outer sheet of the glazing panel.

An additional advantage of the defined positioning of the coating layer in association with the provision of bus bars is the ability the hide the bus bars from view from the exterior of the glazing panel by providing a substantially opaque masking layer, for example a black enamel layer, around a portion of the into concave sur of the glazing panel.

The complexity of curvature is Ceased in respect of glazing panels having a significant width, for example, glazing panels at are between 1.2 m and 1.4 m wide, or between 1.4 m and 1.6 m wide or between 1.6 m and 1.8 m wide.

The invention may be partials suitable for use in relation to vehicle windscreens.

The glazing panel may have a luminous transmittance of greater than 70% or greater than 75%. This may enable its use as a windscreen The glazing panel may have a neutral colour in reflection from its exterior surface, a slightly blue colour or a slightly green colour. This may render it particularly suitable for use in automotive applications. In particular, the colour of the glazing panel in reflection from the exterior may be such that its colour coordinates measured on the CIElab scale at normal incidence are:

$L^*=40\pm3$ $a^*=-6\pm3$ $b^*=-8\pm4$ (this is intended to give a blue tint in reflection, particularly for a windscreen installed at an angel); or
  $L^*=39\pm3$ $a^*=-6\pm3$ $b^*=-2\pm2$ (this is intended to give a green tint in reflection, particularly for a windscreen installed at an angle); or
  $L^*=36\pm3$ $a^*=-5\pm2$ $b^*=-4\pm2$ (this is intended to give a neutral/green tint in reflection, particularly for a windscreen installed at an angle);

The variation is colour In reflection over the surface of the glazing panel may be such that when measured at different points over a single glazing, the values of either $a^*$ and/or $b^*$ measured on the CIElab scale at normal incidence do not vary by more than $\pm1.5$, and preferably by not more than $\pm1$. The variation in colour in reflection is due at least to a significant extent upon variations in the thickness of the film stacks of the coating layer and/or variations in the heating regime during heat treatment over different parts of the glazing. It is perhaps particularly unexpected that such minimal colour variation can be achieved by means of the present invention as it would be expected the extension of the coating layer would stretch the coating layer, at least in some places and/or des*W the integrity of the coating layer and/or tender It unstable during heat treatment Preferably, the variation in colour In reflection between one glazing and another is such that the values of either $a^*$ and/or $b^*$ measured on the CIElab scale at normal incidence do not vary between one glazing and another in a series of glazings by more than $\pm2$, and preferably by not more than $\pm1.5$.

Arranging the resistance of the heatable coating layer to be between about 1.5 and 4 ohms per square may provide particularly suitable heating characteristics for automotive use. Similarly, arranging for the resistance between the bus bars to be between 75 ohm and 8 ohm may a provide particular suitable heating characteristic for automotive use.

According to further aspects, the present invention also provides a curved laminated glazing panel, as defined in claims 15 and 17, and for the use of a sputtered double silver coating layer deposited on a substantially flat sheet of glazing material and subsequently bent into a convex configuration to provide a glazing panel as defined in claim 29.

The glazing material onto which the solar control coating layer is deposited may be a sheet of glass. It is preferably a soda-lime glass, more preferably float glass. It may comprise the following constituent (expressed in percentage by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

An embodiment of the present invention will now be described, by way of example only, with reference to: values of either $a^*$ and/or $b^*$ measured on the CIElab scale at normal incidence do not vary by more than $\pm1.5$, and preferably by not more than $\pm1$. The variation in colour in reflection is due at least to a significant extent upon variations in the thickness of the film stacks of the coating layer and/or variations in the heating regime during heat treatment over different parts of the glazing. It is perhaps particularly unexpected that such minimal colour variation can be achieved by means of the present invention as it would be expected that extension of the coating layer would stretch the coating layer, at least in some places and/or destroy the integrity of the coating layer and/or render it unstable during heat treatment.

Preferably, the variation in colour in reflection between one glazing and another is such that the values of either a* and/or b* measured on the CIElab scale at normal incidence do not vary between one glazing and another in a series of glazings by more than ±2, and preferably by not more than ±1.5.

Arranging the resistance of the heatable coating layer to be between about 1.5 and 4 ohms per square may provide particularly suitable heating characteristics for automotive use. Similarly, arranging for the resistance between the bus bars to be between 0.75 ohm and 8 ohm may also provide particularly suitable heating characteristics for automotive use.

According to further aspects, the present invention also provides a curved laminated glazing panel having a radius of curvature at least one portion that is less than 500 mm in which the glazing panel is provided with a solar control coating layer positioned at its convex internal surface and in which the coating stack comprises at least two spaced sputtered silver containing layers initially deposited on a substantially flat sheet of glazing material which is subsequently bent to form a part of the glazing panel. A curved laminated automotive glazing panel is also provided having a cross curvature of greater than or equal to 15 mm in which the glazing panel is provided with a solar control coating layer positioned at its convex internal surface and in which the coating stack comprises at least two spaced sputtered silver containing layers initially deposited on a substantially flat sheet of glazing material which is subsequently bent to form a part of the glazing panel.

The use of a sputtered double silver coating layer which is initially deposited on a substantially flat sheet of glazing material and subsequently bent into a convex configuration to provide a glazing panel is also provided. The curved laminated automotive glazing panel can have a radius of curvature at at least one portion that is less than 500 mm in which the glazing panel is provided with a solar control coating layer positioned at its convex internal surface and in which the coating stack comprises at least two spaced sputtered silver containing layers initially deposited on a substantially flat sheet of glazing material which is subsequently bent to form a part of the glazing panel. According to this embodiment, the glazing panel can have a radius of curvature at at least one portion that is less than 400 mm, preferably less than 350 mm and even more preferably less than 300 mm. Alternatively, the curved laminated automotive glazing panel can have a cross curvature of greater than or equal to 15 mm in which the lazing panel is provided with a solar control coating layer positioned at its convex internal surface and in which the coating stack comprises at least two spaced sputtered silver containing layer initially deposited on a substantially flat sheet of glazing material which is subsequently bent to form a part of the glazing panel. The glazing panel as set forth above can also have a cross curvature of greater than or equal to 20 mm, preferably greater than or equal to 25 mm and even more preferably greater than or equal to 30 mm. Additionally, the glazing panel can also have a death of bending that is greater than or equal to 150 mm. Further, the coating layer can be adapted to be electrically heatable to provide a de-misting and/or de-icing function to the glazing panel and in which the glazing panel is provided with a pair of spaced bus bars adapted to relay electrical power to heat the solar control coating layer. The glazing panel can also be provided with a substantially opaque band arranged at the internal, concave surface of the glazing panel adapted to mask the bus bars from view from the exterior of the gazing 2 panel. Further, the glazing panel can have a width of greater than about 1.6 m. The glazing panel can be an automotive windscreen. Additionally, the glazing panel can have a luminous transmittance of at least 75% (measured using Illuminant A, 2 degree observer). According to a further embodiment, the color of the glazing panel in reflection from the exterior is such that the color co-ordinates of the glazing panel in reflection from the exterior measured on the CIElab scale at normal incidence are within the range:

| | | |
|---|---|---|
| L* = 40 ± 3 | a* = −6 ± 3 | b* = −8 ± 4; or |
| L* = 39 ± 3 | a* = −6 ± 3 | b* = −2 ± 2; or |
| L* = 36 ± 3 | a* = −5 ± 2 | b* = −4 ± 2. |

According to an additional embodiment, the color variation in reflection over the surface of the glazing panel is such that when measured at different points over a single glazing, the values of either a* and/or b* measured on the CIElab scale at normal incidence do not vary by more than ±1.5, and preferably by not more than ±1. Further, the electrical resistance of the heatable coating layer can be between 1.5 and 4 ohms per square. The glazing panel can also be provided with a pair of spaced bus bars adapted to provide electrical power to heat the solar control coating layer and in which the resistance between the bus bars is between 0.75 and 8 ohms.

The glazing material onto which the solar control coating layer is deposited may be a sheet of glass. It is preferably a soda-lime glass, more preferably float glass. It may comprise the following constituent (expressed in percentage by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

BRIEF DESCRIPTION OF THE FIGURES

An embodiment of the present invention will now be described, by way of example only, with reference to.

DETAILED DESCRIPTION

Figure 1:
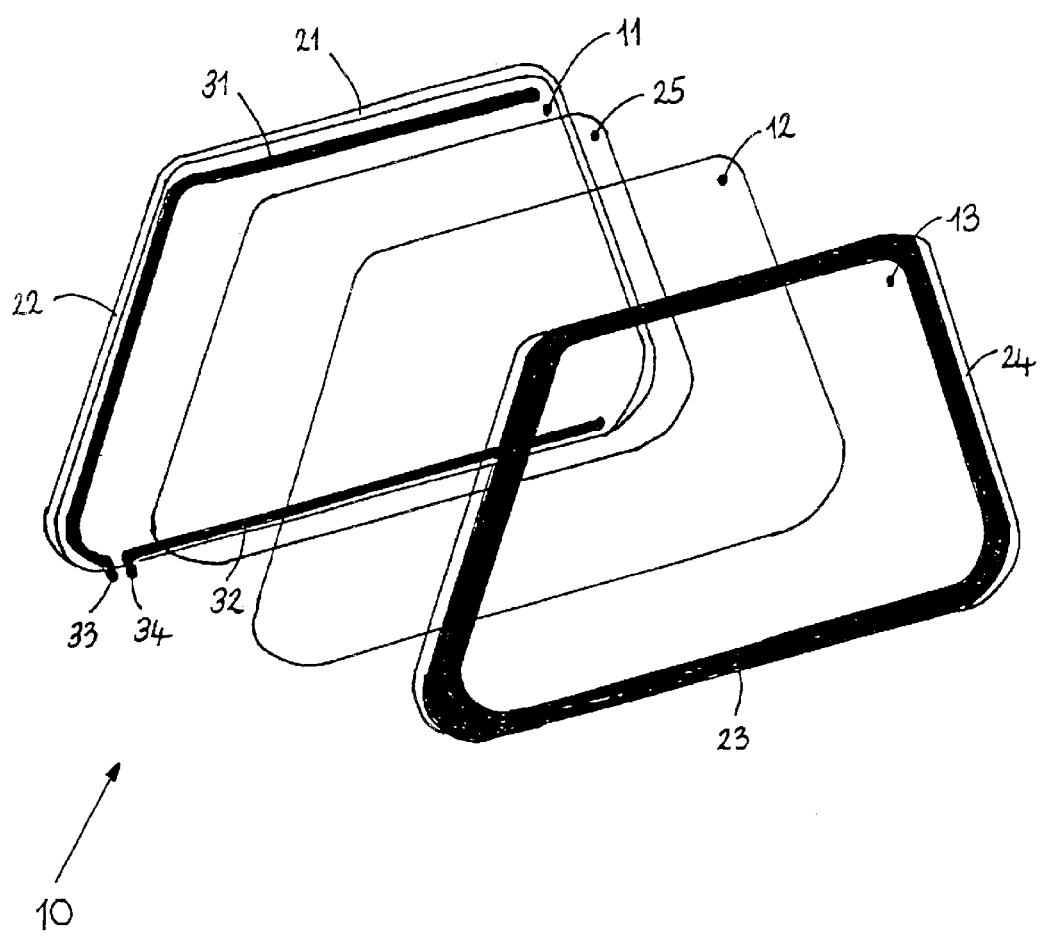
FIG. 1 which is an exploded view showing the overall structure (but not the curvature) of a windscreen.

Windscreen 10 illustrated in FIG. 1 comprises an inner sheet of glass 11 laminated to an outer sheet of glass 13 by means of a sheet of pvb 12.

The windscreen is substantially trapezial in shape having a top edge 21, a longer bottom edge 23 substantially parallel thereto and side edges 22, 24 The windscreen has a spherical, curved configuration so that it is curved both along an axis parallel to the top edge 21 and along an axis perpendicular to the top edge 21 (for ease of representation the curvature of the windscreen is not shown in FIG. 1).

An electrically conducting solar control layer 25 comprising a sputtered double silver coating layer is positioned on the convex face of the inner glazing sheet 11 between the inner and outer sheets of glass 11,13.

The coating layer 25 is produced by sputtering the following layers sequentially onto a substantially flat sheet of glass which is subsequently bent to form the inner glazing sheet 11:

|  | Geometrical thickness | Atomic ratios |
|---|---|---|
| Glass substrate | 2 mm | |
| Base dielectric comprising: | | |
| AlN | 60 Å | |
| ZnAlOx | 250 Å | Al/Zn = 0.1 |
| ZnAlOy underlying barrier | 10 Å | Al/Zn = 0.1 |
| Ag | 100 Å | |
| ZnAlOy overlying barrier | 12 Å | Al/Zn = 0.1 |
| Central dielectric comprising ZnAlOx | 750 Å | Al/Zn = 0.1 |
| ZnAlOy underlying barrier | 7 Å | Al/Zn = 0.1 |
| Ag | 100 Å | |
| ZnAlOy overlying barrier | 17 Å | Al/Zn = 0.1 |
| Top dielectric comprising: | | |
| ZnAlOx | 185 Å | Al/Zn = 0.1 |
| AlN | 85 Å | | in which ZnAlOx is a mixed oxide containing Zn and Al deposited in this example by reactively sputtering a target which is an alloy or mixture of Zn and Al in the presence of oxygen.

Alternatively, a mixed oxide layer may be formed by sputtering a target which is a mixture of zinc oxide and aluminum oxide particularly in an argon gas or argon rich oxygen containing atmosphere.

The ZnAlOy barriers are similarly deposited by sputtering a target which is an alloy or mixture of Zn and Al in an argon rich oxygen containing atmosphere to deposit a barrier that is not fully oxidised.

The oxidation state in each of the base, central and top ZnAlOx dielectric layers need not necessarily be the same. Similarly, the oxidation state in each of the ZnAlOy barriers need not be the same. Equally, the Al/Zn ratio need not be the same for all of the layers; for example, the barrier layers may have a different Al/Zn ratio to the antireflective dielectric layers and the antireflective dielectric layers may have different Al/Zn ratios from each other.

Each overlying barrier protects its underlying silver layer from oxidation during sputter deposition of its overlying ZnAlOx oxide layer. Whilst further oxidation of these barriers layers may occur during deposition of their overlying oxide layers a portion of these barriers preferably remains in the form of an oxide that is not fully oxidised to provide a barrier for subsequent heat treatment of the glazing panel.

The glazing sheet carrying the sputtered double silver coating stack is subsequently heated, bent to its desired curvature and assembled with a sheet of pvb into a laminated vehicle windscreen which has the following properties:

| Property | Prior to heat treatment[Note 1] below | Following heat treatment[Note 2] below |
|---|---|---|
| TL (Illuminant A) | 63% | 76% |
| TE (System Moon 2) | 38% | 42% |
| haze | 0.1 | 0.25 |
| a* | −20 (coated side) | −6 (external) |
| b* | +3 (coated side) | −12 (external) |
| RE (System Moon 2) | 31% (coated side) | 33% (external) |

[Note 1] Measured for monolithic glazing panel with coating prior to heat treatment
[Note 2] Measured following heat treatment at 650° C. for 10 minutes followed by bending and tempering, and lamination with clear 2 mm glass sheet and 0.76 mm clear pvb Heat treatment preferably causes substantially complete oxidation of all of the barrier layers such that the structure of the coating stack after heat treatment is:

|  | Geometrical thickness | Atomic ratios |
|---|---|---|
| Glass substrate | 2 mm | |
| Base dielectric comprising: | | |
| AlN (partially oxidized) | 60 Å | |
| ZnAlOx | 250 Å | Al/Zn = 0.1 |
| ZnAlOx (oxidised underlying barrier) | 10 Å–16 Å | Al/Zn = 0.1 |
| Ag | 100 Å | |
| ZnAlOx (oxidised overlying barrier) | 12 Å–20 Å | Al/Zn = 0.1 |
| Central dielectric comprising ZnAlOx | 750 Å | Al/Zn = 0.1 |
| ZnAlOx (oxidised underlying barrier) | 7 Å–12 Å | Al/Zn = 0.1 |
| Ag | 100 Å | |
| ZnAlOx (oxidised overlying barrier) | 17 Å–28 Å | |
| Top dielectric comprising: | | |
| ZnAlOx | 185 Å | Al/Zn = 0.1 |
| AlN (partially oxidised) | 85 Å | |

The AlN (partially oxidised) layers may comprise a mixture of AlN and $Al_2O_3$, the AlN being partially oxidised during the heat treatment process. The barrier layers are not necessarily completely oxidised and their thickness will depend to a certain extent upon their degree of oxidation.

The coating layer 25 is spaced from the external periphery of the windscreen by a non-conducting peripheral band (not shown) provided in this is example by a band in which the coating layer has either not been deposited or has been removed. This prevents the electrically conductive coating extending to the very edge of the windscreen and may also reduce the risk of corrosion of the coating layer.

Electrical power is supplied to the coating layer via a first bus bar 31 arranged in contact with the coating layer 25 adjacent to the top edge 21 of the windscreen and a second bus bar 32 arranged in contact with the coating layer 25 adjacent to the bottom edge 23 of the windscreen. Connectors 33,34 for facilitating connection of the bus bars to a car's electrical circuit may protrude from the glazing and may be arranged adjacent to each other. The first bus bar has a portion which runs down the side edge 22 of the windscreen along a portion of the glazing panel 11 to at which the coating layer 25 is not present so that there is no electrical connection between this portion of the bus bar and the coating layer. This allows the connector 33 to be positioned at the bottom edge 22 of the windscreen. The bus bars may be formed in any suitable manner, for example by silk screen printing of a conducting enamel material underneath or on top of the coating layer or by means of conducting tape or metal strips.

Figure 2:
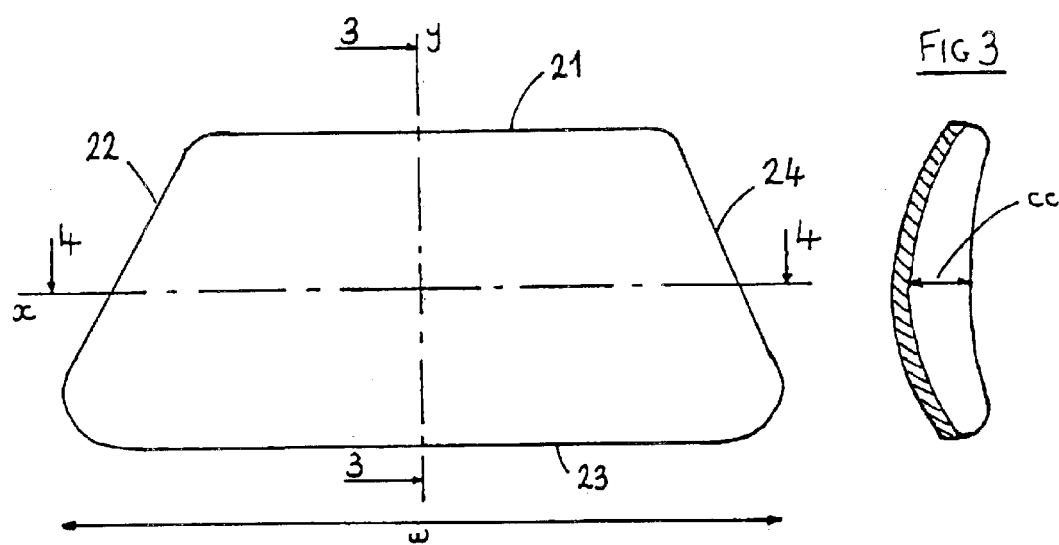
FIG. 2 which is a plan view of a curved, laminated, automotive windscreen.
Figure 3:
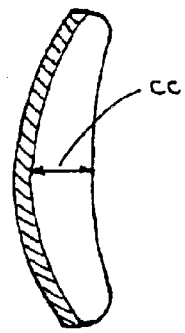
FIG. 3 which is a section along line 3—3 of FIG. 2.
Figure 4:
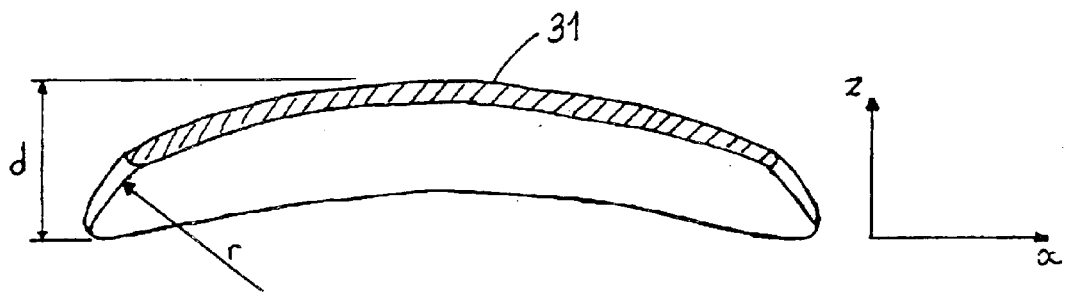
FIG. 4 which is a section along line 4—4 of FIG. 2.

FIGS. 2,3 and 4 illustrate the curvature and dimensions of the glazing, the significant measurements in this case being:

w the width of the glazing window r the radius of curvature of the glazing panel. Different portions of the glazing panel will have different radii of curvature cc the cross curvature of the windscreen. The cross curvature may be measured by placing the convex surface 13 of the windscreen on a surface, placing a straight, rigid bar at the concave face of the windscreen along axis y such that the bar rests against a point at the top edge 21 of the windscreen and against a point at the bottom edge 23 of the windscreen and measuring the distance between the underside of the bar and the concave surface of the windscreen. The maximum cross curvature is the maximum distance, usually at the centre of the windscreen, which the windscreen has been bent parallel to axis y.

d the depth of the windscreen. The maximum depth is the maximum distance measured parallel to axis z between the outer surface of the convex surface of the laminated windscreen 13 and the furthest spaced portion on the side wings of the windscreen.

What is claimed is:

1. A method of manufacturing a curved laminated automotive glazing panel, comprising the steps of:
   (a) depositing a solar control coating layer comprising a coating stack having at least two spaced sputtered silver containing layers on a substantially flat sheet of glazing material;
   (b) bending said substantially flat sheet of glazing material carrying said solar control coating layer such that the solar control coating layer is positioned at a convex surface of the bent sheet of glazing material;
   (c) laminating said bent sheet of glazing material carrying the solar control coating layer at a convex surface with another sheet of glazing material to form a glazing panel in which the solar control coating layer is positioned at the interior of the glazing panel; and
   wherein the laminated automotive glazing panel is curved according to at least one of the following (d) and (e):
   (d) the curved laminated automotive glazing panel has at least one portion having a radius of curvature that is less than 500 mm;
   (e) the curved laminated automotive glazing panel has a cross curvature of greater than or equal to 15 mm.

2. A method of manufacturing a curved laminated automotive glazing panel, comprising the steps of:
   (a) depositing a solar control coating layer comprising a coating stack having at least two spaced sputtered silver containing layers on a substantially flat sheet of glazing material;
   (b) bending said substantially flat sheet of glazing material carrying said solar control coating layer such that the solar control coating layer is positioned at a convex surface of the bent sheet of glazing material;
   (c) laminating said bent sheet of glazing material carving the solar control coating layer at a convex surface with another sheet of gazing material to form a glazing panel in which the solar control coating layer is positioned at the interior of the glazing panel; and
   wherein the laminated automotive glazing panel is curved according to both of the following (d) and (e);
   (d) the curved laminated automotive glazing panel has at least one portion having a radius of curvature that is less than 500 mm;
   (e) the curved laminated automotive glazing panel has a cross curvature of greater than or equal to 15 mm.

3. A method according to claim 1, and further including at least one of the following (f) through (m):
   (f) the curved laminated automotive glazing panel has a depth of bending that is greater than or equal to 150 mm;
   (g) the coating layer is adapted to be electrically heatable to provide a de-icing and/or de-icing function to the glazing panel and in which the glazing panel is provided with a pair of spaced bus bars adapted to relay electrical power to heat the solar control containing layer;
   (h) the curved laminated automotive glazing panel has a width of greater than about 1.6 m;
   (i) the curved laminated automotive glazing panel has a luminous transmittance of at least 75% (measured using Illuminant A, 2 degree observer);
   (j) the colour co-ordinates of the curved laminated automotive glazing panel in reflection from the exterior measured on the CIElab scale at normal incidence are within the range:

$$L^* = 40 \pm 3 \quad a^* = -6 \pm 3 \quad b^* = -8 \pm 4; \text{ or}$$

$$L^* = 39 \pm 3 \quad a^* = -6 \pm 3 \quad b^* = -2 \pm 4; \text{ or}$$

$$L^* = 36 \pm 3 \quad a^* = -5 \pm 2 \quad b^* = -4 \pm 2;$$

(k) colour variation in reflection over the surface of the glazing panel is such that when measured at different points over a single glazing, the values of a* and/or b* measured on the CIElab scale at normal incidence do not vary but more than ±1.5;
   (l) the electrical resistance of the coating layer is between 1.5 and 4 ohms per square; and
   (m) the glazing panel is provided with a pair of spaced bus bars adapted to provide electrical power to heat the solar control coating layer and in which the resistance between the bus bars is between about 0.75 and 8 ohms.

4. A method according to claim 3, and including at least two of the aforementioned features (f) through (m).

5. A method of manufacturing a curved laminated automotive glazing panel, comprising the steps of:
   (a) depositing a solar control coating layer comprising a coating stack having at least two spaced sputtered silver containing layers on a substantially flat sheet of glazing material;
   (b) bending said substantially flat sheet of glazing material carrying said solar control coating layer such that the solar control coating layer is positioned at a convex surface of the bent sheet of glazing material;
   (c) laminating said bent sheet of glazing material carrying the solar control coating layer at a convex surface with another sheet of glazing material to form a glazing, panel in which the solar control coating layer is positioned at the interior of the glazing panel; and
   wherein the laminated automotive glazing panel is curved according to at least one of the following (d) and (e):

(d) the curved laminated automotive glazing panel has at least one portion having a radius of curvature that is less than 500 mm;

(e) the curved laminated automotive glazing, panel has a cross curvature of greater than or equal to 15 mm;

the method including at least three of the following features (f) through (m);

(f) the curved laminated automotive glazing panel has a depth of bending that is greater than or equal to 150 mm;

(g) the coating layer is adapted to be electrically heatable to provide a de-misting and/or de-icing function to the glazing panel and in which the glazing panel is provided with a pair of spaced bus bars adapted to relay electrical power to heat the solar control containing layer;

(h) the curved laminated automotive lazing panel has a width of greater than about 1.6 m;

(i) the curved laminated automotive glazing panel has a luminous transmittance of at least 75% (measured using Illuminant A, 2 degree observers);

(j) the colour co-ordinates of the curved laminated automotive glazing panel in reflection from the exterior measured on the CIElab scale at normal incidence are within the range:

| | | |
|---|---|---|
| $L^* = 40 \pm 3$ | $a^* = -6 \pm 3$ | $b^* = -8 \pm 4$: or |
| $L^* = 39 \pm 3$ | $a^* = -6 \pm 3$ | $b^* = -2 \pm 4$; or |
| $L^* = 36 \pm 3$ | $a^* = -5 \pm 2$ | $b^* = -4 \pm 2$; |

(k) colour variation in reflection over the surface of the glazing panel is such that when measured at different points over a single glazing, the values of $a^*$ and/or $b^*$ measured on the CIElab scale at normal incidence do not vary but more than $\pm 1.5$;

(l) the electrical resistance of the coating layer is between 1.5 and 4 ohms per square; and (m) the glazing panel is provided with a pair of spaced bus bars adapted to provide electrical power to heat the solar control coating layer and in which the resistance between the bus bars is between about 0.75 and 8 ohms.

6. A method according to claim 5, and including all of the aforementioned features (f) through (m).

7. A method according to claim 1, and including at least one of the following (n) through (p):

(n) the glazing panel has a radius of curvature at said at least one portion that is less than 400 mm;

(o) the glazing panel has a radius of curvature at said at least one portion that is less than 350 mm;

(p) the glazing panel has a radius of curvature at said at least one portion that is less than 300 mm.

8. A method of manufacturing a curved laminated automotive glazing panel, comprising the steps of:

(a) depositing a solar control coating layer comprising a coating stack having at least two spaced sputtered silver containing layers on a substantially flat sheet of glazing material;

(b) bending said substantially flat sheet of glazing material carrying said solar control coating layer such that the solar control coating layer is positioned at a convex surface of the bent sheet of glazing material;

(c) laminating said bent sheet of glazing material carrying the solar control coating layer at a convex surface with another sheet of lazing material to form a glazing panel in which the solar control coating layer is positioned at the interior of the glazing panel; and wherein the laminated automotive glazing panel is curved according to at least one of the following (d) and (e);

(d) the curved laminated automotive glazing panel has at least one portion having a radius of curvature that is less than 500 mm;

(e) the curved laminated automotive glazing panel has across curvature of greater than or equal to 15 mm;

wherein the glazing panel has at least one of the following features (q) through (s);

(q) the glazing panel has a cross curvature of greater than or equal to 20 mm;

(r) the glazing panel has a cross curvature of greater than or equal to 25 mm;

(s) the glazing panel has a cross curvature of greater than or equal to 30 mm.

9. A method according to claim 3, including the aforementioned (g) and wherein the glazing panel is provided with a substantially opaque band arranged at the internal, concave surface of the glazing panel adapted to mask the bus bars from view from the exterior of the glazing panel.

10. A method according to claim 1, in which the glazing panel is an automotive windscreen.

11. A curved laminated automotive glazing panel, comprising:

(a) a solar control coating layer comprising a coating stack, said solar control coating layer positioned at the convex internal surface of the glazing panel;

(b) said coating stack having at least two spaced sputtered silver containing layers, wherein the solar control coating layer is sputter deposited on a surface of a first substantially flat sheet of glazing material which is subsequently bent such that the solar control coating layer is at a convex surface of said first sheet of glazing material;

(c) another sheet of glazing material laminated to said first sheet of glazing material having said solar control coating layer positioned thereon, to form a glazing panel in which the solar control coating layer is positioned at the interior of the glazing panel; and wherein the laminated automotive glazing panel is curved according to at least one of the following (d) and (e);

(d) the curved laminated automotive glazing panel has at least one portion having a radius of curvature that is less than 500 mm;

(e) the curved laminated automotive glazing panel has a cross curvature of greater than or equal to 15 mm.

12. A curved laminated automotive glazing panel, comprising:

(a) a solar control coating layer comprising a coating stack, said solar control coating layer positioned at the convex internal surface of the glazing panel;

(b) said coating stack having at least two spaced sputtered silver containing layers on a first substantially flat sheet of glazing material which is subsequently bent such that the solar control coating layer is at a convex surface of said first sheet of glazing material;

(c) another sheet of glazing material laminated to said first sheet of glazing material having said solar control coating layer positioned thereon, to form a glazing panel in which the solar control coating layer is positioned at the interior of the glazing panel; and wherein the glazing panel is curved according to both of the following (d) and (e);

(d) the curved laminated automotive glazing panel has at least one portion having a radius of curvature that is less than 500 mm;

(e) the curved laminated automotive glazing panel has a cross curvature of greater than or equal to 15 mm.

13. A glazing panel according to claim 11, and further including at least one of the following (f) through (m):

(f) the curved laminated automotive glazing panel has a depth of bending that is greater than or equal to 150 mm;

(g) the coating layer is adapted to be electrically heatable to provide a de-misting and/or de-icing function to the glazing panel and in which the glazing panel is provided with a pair of spaced bus bars adapted to relay electrical power to heat the solar control containing layer;

(h) the curved laminated automotive glazing panel has a width of greater than about 1.6 m;

(i) the curved laminated automotive glazing panel has a luminous transmittance of at least 75% (measured using Illuminant A, 2 degree observer);

(j) the colour co-ordinates of the curved laminated automotive glazing panel in reflection from the exterior measured on the CEIlab scale at normal incidence are within the range:

| | | |
|---|---|---|
| L* = 40 ± 3 | a* = −6 ± 3 | b* = −8 ± 4: or |
| L* = 39 ± 3 | a* = −6 ± 3 | b* = −2 ± 4; or |
| L* = 36 ± 3 | a* = −5 ± 2 | b* = −4 ± 2; |

(k) colour variation in reflection over the surface of the glazing panel is such that when measured at different points over a single glazing, the values of a* and/or b* measured on the CEIlab scale at normal incidence do not vary but more than ±1.5;

(l) the electrical resistance of the coating layer is between 1.5 and 4 ohms per square; and (m) the glazing panel is provided with a pair of spaced bus bars adapted to provide electrical power to heat the solar control coating layer and in which the resistance between the bus bars is between about 0.75 and 8 ohms.

14. A glazing panel according to claim 13, and including at least two of the aforementioned features (f) through (m).

15. A curved laminated automotive glazing panel, comprising:

(a) a solar control coating layer comprising a coating stack, said solar control coating layer positioned at the convex internal surface of the glazing panel;

(b) said coating stack having at least two spaced sputtered silver containing layers on a first substantially flat sheet of glazing material which is subsequently bent such that the solar control coating layer is at a convex surface of said first sheet of glazing material;

(c) another sheet of glazing material laminated to said first sheet of glazing material having said solar control coating layer positioned thereon, to form a glazing panel in which the solar control coating layer is positioned at the interior of the glazing panel; and wherein the laminated automotive glazing panel is curved according to at least one of the following (d) and (e);

(d) the curved laminated automotive Blazing panel has at least one portion having a radius of curvature that is less than 500 mm;

(e) the curved laminated automotive glazing panel has a cross curvature of greater than or equal to 15 mm;

the glazing panel further including at least three of the following features (f) through (m);

(f) the curved laminated automotive glazing panel has a depth of bending that is greater than or equal to 150 mm;

(g) the coating layer is adapted to be electrically heatable to provide a de-misting and/or de-icing function to the glazing panel and in which the gazing panel is provided with a pair of spaced bus bars adapted to relay electrical power to heat the solar control containing layer;

(h) the curved laminated automotive glazing panel has a width of greater than about 1.6 m;

(i) the curved laminated automotive glazing panel has a luminous transmittance of at least 75% (measured using Illuminant A, 2 degree observer);

(j) the colour co-ordinates of the curved laminated automotive glazing panel in reflection from the exterior measured on the CIElab scale at normal incidence are within the range:

| | | |
|---|---|---|
| L* = 40 " 3 | a* = −6 " 3 | b* = −8 " 4; or |
| L* = 39 " 3 | a* = −6 " 3 | b* = −2 " 4; or |
| L* = 36 " 3 | a* = −5 " 2 | b* = −4 " 2; |

(k) colour variation in reflection over the surface of the glazing panel is such that when measured at different points over a single glazing, the values of a* and/or b* measured on the CIElab scale at normal incidence do not vary but more than "1.5;

(l) the electrical resistance of the coating layer is between 1.5 and 4 ohms per square; and (m) the glazing panel is provided with a pair of spaced bus bars adapted to provide electrical power to heat the solar control coating layer and in which the resistance between the bus bars is between about 0.75 and 8 ohms.

16. A glazing panel according to claim 15, and including all of the aforementioned features (f) through (m).

17. A glazing panel according to claim 12, and including at least one of the following (n) through (p);

(n) the glazing panel has a radius of curvature at said at least one portion that is less than 400 mm;

(o) the glazing panel has a radius of curvature at said at least one portion that is less than 350 mm;

(p) the glazing panel has a radius of curvature at said at least one portion that is less than 300 mm.

18. A glazing panel according to claim 12, and including at least one of the following (q) through (s):

(q) the glazing panel has a cross curvature of greater than or equal to 20 mm;

(r) the glazing panel has a cross curvature of greater than or equal to 25 mm;

(s) the glazing panel has a cross curvature of greater than or equal to 30 mm.

19. A glazing panel according to claim 13, including the aforementioned (g) and wherein the glazing panel is provided, with a substantially opaque band arranged at the internal, concave surface of the glazing panel adapted to mask the bus bars from view from the exterior of the glazing panel.

20. A glazing panel according to claim 11, in which the glazing panel is an automotive windscreen.

21. The method of claim 1, wherein the glazing material is glass.

22. The method of claim 2, wherein the glazing material is glass.

23. The method of claim 5, wherein the glazing material is glass.

24. The method of claim 8, wherein the glazing material is glass.

25. The glazing panel of claim 11, wherein the glazing material is glass.

26. The glazing panel of claim 12, wherein the glazing material is glass.

27. The glazing panel of claim 15, wherein the glazing material is glass.

* * * * *